(12) United States Patent
Khoshkava et al.

(10) Patent No.: US 10,120,449 B2
(45) Date of Patent: Nov. 6, 2018

(54) PARALLEL PLATE ACTUATOR

(71) Applicant: IMMERSION CORPORATION, San Jose, CA (US)

(72) Inventors: Vahid Khoshkava, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/239,965

(22) Filed: Aug. 18, 2016

(65) Prior Publication Data

US 2017/0060244 A1    Mar. 2, 2017

Related U.S. Application Data

(60) Provisional application No. 62/209,738, filed on Aug. 25, 2015.

(51) Int. Cl.
*G06F 3/01* (2006.01)
*G06F 3/041* (2006.01)
*G08B 6/00* (2006.01)

(52) U.S. Cl.
CPC .......... *G06F 3/016* (2013.01); *G06F 3/0414* (2013.01); *G08B 6/00* (2013.01); *G06F 2203/04105* (2013.01)

(58) Field of Classification Search
CPC ...................................................... G08B 6/00
See application file for complete search history.

(56) References Cited

U.S. PATENT DOCUMENTS

| | | | |
|---|---|---|---|
| 2010/0171715 A1 | 7/2010 | Peterson et al. | |
| 2010/0250071 A1* | 9/2010 | Pala | B60K 35/00 701/48 |
| 2011/0227872 A1 | 9/2011 | Huska et al. | |
| 2013/0044049 A1* | 2/2013 | Biggs | G06F 3/016 345/156 |
| 2014/0206976 A1* | 7/2014 | Thompson | A61B 5/0006 600/391 |
| 2014/0354570 A1* | 12/2014 | Makinen | G06F 3/041 345/173 |

FOREIGN PATENT DOCUMENTS

| | | |
|---|---|---|
| EP | 2821912 | 7/2015 |
| WO | 2015015428 | 2/2015 |

OTHER PUBLICATIONS

Jung, et al., "Fabrication of composite and sheet metal laminated bistable jumping mechanism," Journal of Mechanisms and Robotics 7:021010(10 pages) (2015).

(Continued)

*Primary Examiner* — Curtis Odom
(74) *Attorney, Agent, or Firm* — Medler Ferro Woodhouse & Mills PLLC (57) ABSTRACT

The present application relates generally to haptic actuators. For example, the application is directed to high performance parallel plate actuators, and more particularly an actuator that can be used to provide haptic feedback in a variety applications such as buttons, panels, track pads, touch panels, wearables, gaming devices and/or touch-sensitive surfaces.

26 Claims, 4 Drawing Sheets

(56) References Cited

OTHER PUBLICATIONS

Nield, D., "This new shape-shifting polymer can lift 1,000 times its own weight," http://www.sciencealert.com/this-new-shape-shifting-polymer-can-lift-1-000-times-its-own-weight?perpetual=yes&limitstart=1, Feb. 17, 2016.
O'Hare, R., "No more sunburn! High-tech skin patch monitors exposure to UV rays and tells you when to apply sunscreen," http://www.dailymail.co.uk/sciencetech/article-3386856/No-sunburn-High-tech-skin-patch-monitors-exposure-UV-rays-tells-apply-sunscreen.html, Jan. 6, 2016.
Palleau, et al., "Reversible patterning and actuation of hydrogels by electrically assisted ionoprinting," Nature communications 4:2257(7 pages) (2013).
Boyko Stoimenov-Research, http://getbioinspiration.free.fr/research/research.html, 4 pages, Jul. 3, 2007.

\* cited by examiner

PARALLEL PLATE ACTUATOR

CROSS-REFERENCE TO RELATED APPLICATIONS

The present application claims benefit of U.S. Provisional Patent Application No. 62/209,738, entitled "Parallel Plate Actuator," filed Aug. 25, 2015, the disclosure of which is incorporated by reference herein in its entirety.

FIELD OF THE INVENTION

The present application relates generally to haptic actuators. For example, the application is directed to high performance parallel plate actuators, and more particularly an actuator that can be used to provide haptic feedback in a variety applications such as buttons, panels, track pads, touch panels, wearables, gaming devices and/or touch-sensitive surfaces.

BACKGROUND

Haptic effects are used to enhance the interaction of an individual with an electronic device. Haptic effects enable the user to experience a touch sensation, which is typically generated by an actuator embedded in the device. Such a haptic effect actuator provides acknowledgment or feedback of a user's interaction with the electronic device, alternatively or in addition to visual and/or audio effects via a display or audio device.

Eccentric rotating mass (ERM) motor and linear resonant actuators (LRA) are bulky and generally do not provide local haptic feedback. Smart actuators such as piezo polymers/ceramics and smart gels have been used but are often weak or cannot provide strong local vibration. Moreover, many are designed in a way that just provide constant acceleration/vibration. Conventional parallel plate actuators for haptics require high voltage and in general have a weak blocking force.

There is therefore a need for thin actuators to generate haptic feedback.

SUMMARY

In view of the foregoing, provided herein are systems and methods for providing haptic feedback to a user, including parallel plate actuators.

In embodiments, provided herein are actuators for providing haptic feedback to a user. Suitably, such actuators comprise a parallel plate structure comprising a first plate comprising a first conductor and at least a first insulator, a second plate comprising a second conductor and at least a second insulator, and one or more spacers positioned between and separating the first plate and the second plate. Suitably a first contact of the parallel plate structure by the user at a first force provides a haptic feedback from an electrostatic interaction, and a second contact by the user at a second force, which is greater than the first force, compresses the spacers and activates an additional haptic feedback to the user.

Also provided herein are actuators for providing haptic feedback to a user, comprising a first electrode, a second electrode, and one or more spacers positioned between and separating the first electrode and the second electrode. Suitably a first contact of the actuator by the user at a first force provides a haptic feedback from an electrostatic interaction, and a second contact by the user at a second force, which is higher than the first force, compresses the spacers and activates an additional haptic feedback from an electrostatic interaction.

In additional embodiments, provided herein are devices for providing a first haptic feedback and a second haptic feedback to a user in response to a first contact and a second contact. In embodiments, the devices include a substrate and a parallel plate structure associated with the substrate. The parallel structure includes a first plate comprising a first conductor and at least a first insulator, a second plate comprising a second conductor and at least a second insulator, and one or more spacers positioned between and separating the first plate and the second plate. The first contact from the user at a first force provides the first haptic feedback from an electrostatic interaction, and the second contact from the user at a second force, which is higher than the first force, compresses the spacers and activates the second haptic feedback.

BRIEF DESCRIPTION OF THE DRAWINGS

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

In embodiments, provided herein are thin actuators for providing haptic feedback to a user. The thin actuators are suitably based on parallel plate actuators with higher performance and/or different vibration than a simple parallel plate actuator. Performance of the actuator is amplified by providing the parallel plate actuator with smart material actuators, piezo (polymer or ceramic) and/or hydrogels, as described throughout.

As used herein "haptic feedback" refers to information such as vibration, texture, and/or heat, etc., that are transferred, via the sense of touch, from a system as described herein to a user. Haptic feedback is also described herein as providing a "haptic feedback signal."

Figure 1A:
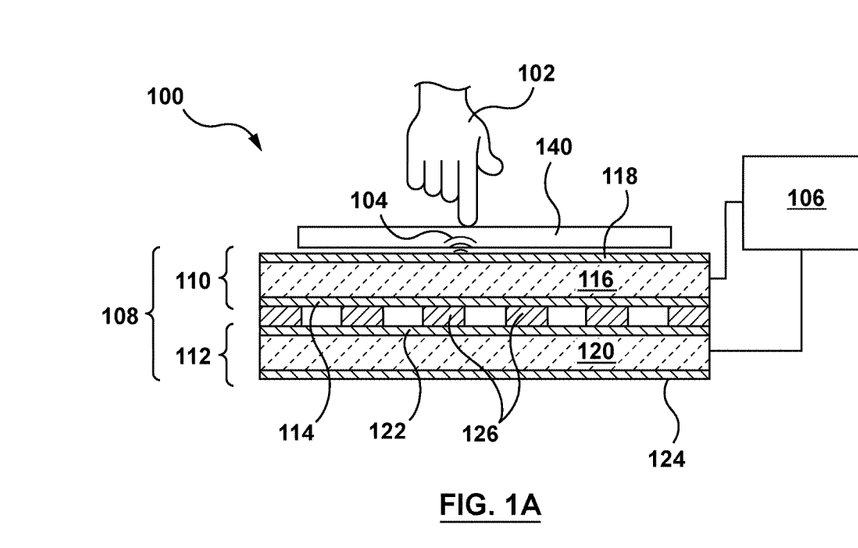
FIG. 1A shows a sectional view of an actuator for providing haptic feedback in accordance with an embodiment hereof.

In embodiments, provided herein are actuators 100, for providing haptic feedback to a user, for example as shown in FIG. 1A.

In embodiments, actuator 100, shown in FIG. 1A, comprises a parallel plate structure 108. Parallel plate structure 108 is a parallel plate actuator which suitably includes a first plate 110 comprising a first conductor 116 and at least a first insulator 114. As shown in FIG. 1, in embodiments, first plate 110 also further comprises an additional insulator 118.

Parallel plate structure 108 further includes a second plate 112 comprising a second conductor 120 and at least a second insulator 122. In embodiments, second plate 112 can also further include an additional insulator 124. However, in further embodiments, it is not required that second conductor 120 comprise an insulator. Instead, first conductor 116 (which is closest to user), may be the only conductor of the parallel plate structure that requires insulator 114.

As shown in FIG. 1A, parallel plate structure 108 also includes one or more spacers 126. Spacers 126 are suitably positioned between and separating first plate 110, and second plate 112. This results in a configuration called "parallel plate" as described herein, such that two conductive plates or conductive elements are separated by spacer elements, resulting in a structure which can store energy in the form of an electrostatic field between the plates.

As shown in FIG. 1A, in embodiments, actuator 100 also includes a substrate 140 in association with parallel plate structure 108 that provides a user interface for user 102. Examples of substrate 140 include various touchpads or screens, keyboard structures, game pads and other device interfaces. Substrate 140 can be associated with actuator 100 via physical bonding (e.g., glue, adhesive, metallic soldering, etc.) or via electronic (wired or unwired) coupling or connection to actuator 100. The various actuators and substrates described herein can be integrated into devices such as, but not limited to, wearables, touch screens, touch pads, mobile phones, tablets, gaming systems and controllers, computers etc.

A user's first or initial interaction or contact with a device or assembly containing the parallel plate structures described herein (for example, contact or interaction with substrate 140 or other user interface, including direct contact, if appropriate, with parallel plate structure 108) haptic feedback 104 is provided. This first contact or interaction from the user is at a first force. Suitably, this first, initial haptic feedback is in the form of an electrostatic interaction or electrostatic field causing a vibration or pulse in response to the initial contact or interaction by the user with the assembly, device, substrate, interface or directly with the parallel plate. In embodiments this first or initial contact from the user is at a first force that does not compress spacers 126, but simply triggers an initial haptic feedback from the electrostatic force between the first and second plates 110, 112 attracting/repulsing one another.

Figure 1B:
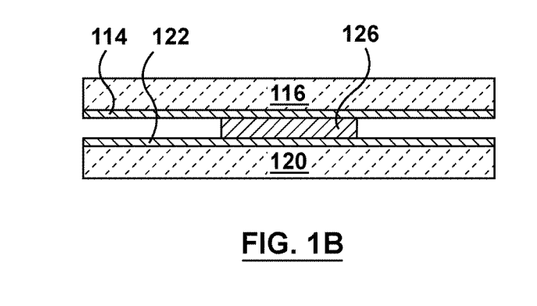
FIG. 1B shows a sectional view of a compressed spacer in accordance with an embodiment hereof.

Upon a second, further contact by user 102, spacers 126 compress, for example, as shown in FIG. 1B (expanded illustration of a single spacer 126 being compressed). The second contact is at a second force, which is higher than the first force, and results in the compression of spacers 126. The compression activates a second, additional haptic feedback to user 102.

In embodiments, the second contact is a continuation of the first contact. That is, a user does not remove his or her contact from the assembly, device, interface or substrate, (or parallel plate structure), but instead applies a second, suitably higher, force to initiate the additional haptic feedback, as described herein. In such embodiments, the first and second contacts, as used herein, simply designate an initial interaction from the user and related feedback to the user, followed by a further, or second interaction from the user, followed by an additional haptic feedback to the user, where the first and second contacts are not distinguished by removing of a user's contact or interaction. Rather, the user maintains contact or interaction, and simply increases (or decreases, or repeats) the force of interaction with the assembly or device containing the parallel plate structure, leading to the distinct haptic feedbacks described herein.

In exemplary embodiments, one or more spacers 126 suitably comprise a hydrogel, including a smart hydrogel. As used herein, "hydrogel" refers to a network of cross-linked hydrophilic polymers capable of absorbing and releasing large amounts of water while maintaining their structural integrity. Hydrogels exhibit the ability to change shape in response to external stimuli such as salinity, buffer conditions or components, pH, temperature, light, as well as an electric field. Exemplary hydrogels include for example, polyelectrolytes such as sodium polyacrylate (pNaAc), such as is disclosed in Palleau et al., "Reversible patterning and actuation of hydrogels by electrically assisted ionoprinting," *Nature Communications* 4:2257 (2013), the disclosure of which is incorporated by reference herein in its entirety, including for the disclosure therein of hydrogels and methods of preparing such.

In embodiments, deforming a hydrogel spacer by compression from the second contact at the second force allows for the first and second plates 110, 12 to move closer together, increasing the electrostatic interaction between them (by reducing the distance between the plates), and providing the second, additional haptic feedback to the user. In embodiments, this second, additional haptic feedback is distinct from the first haptic feedback, such that the user experiences two distinct haptic feedbacks (in such embodiments, an electrostatic interaction), one from the first, initial contact with actuator 100, and another with the second interaction, which results in a compression of spacers 126.

In still further embodiments, compression of the spacers can provide additional energy to the actuator, for example, with the use of certain polymeric spacers or piezo polymers or piezo ceramics, or dielectric elastomers used as spacers 126. In such embodiments, compression of a piezo structure (i.e., polymer or ceramic) can transfer additional energy to the first and second plates 110, 112, to further increase the strength or duration of the electrostatic interaction, thus providing a second, additional haptic feedback that can be a stronger electrostatic feedback. Thus, in certain embodiments, spacers 126 can add extra actuation to parallel plate structure 108, and/or enhance a haptic response thereof. For example, smart gels or polymers can expand/deform under an electric field, thus providing extra actuation to the system, and/or enhancing a haptic response thereof.

Figure 2:
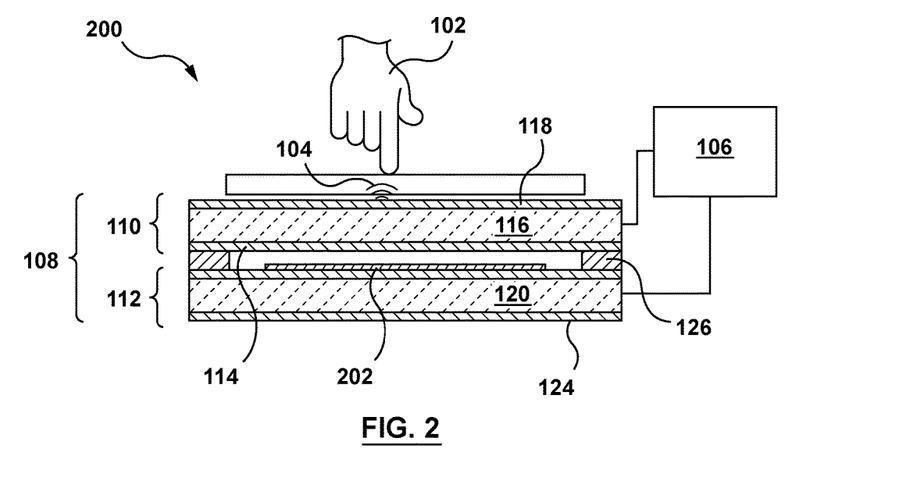
FIG. 2 shows a sectional view of an additional actuator for providing haptic feedback in accordance with an embodiment hereof.

In a still further embodiment, as shown with regard to actuator 200 in FIG. 2, a piezoelectric structure 202 can be placed between plates 110 and 112. Upon compression of spacers 126, plate 110 will ultimately contact piezoelectric structure 202 causing compression of the piezoelectric structure. This compression of the piezoelectric structure can transfer additional energy to parallel plate structure 108, resulting in an additional, further haptic response by virtue of an increased electrostatic force between the first and second plates. Piezoelectric structure 202 (e.g., a piezoelectric polymer or piezoelectric ceramic) can be applied as a very thin coating on one of the first and second plates 110, 112, and/or including on the first and second insulators 114, 122 if desired.

As described herein, suitably spacers 126 are smart actuators, including piezo(polymer or ceramic) materials or elastic hydrogels, that can amplify the actuation force and acceleration (i.e., vibration) of the plates. Suitably, the haptic feedback from the initial electrostatic interaction (i.e., from the first, initial contact from the user) is at a first frequency and the additional haptic feedback (i.e., from the second, additional contact at a higher force which results in compression of spacers 126) is at a second frequency. The ability to provide two (or more) distinct haptic feedbacks to a user, for example at different accelerations, from parallel plate structure 108, is a unique advantage of the actuators described herein. In embodiments, as the distance between the first and second plates 110, 112 decreases from compression of spacers 126, the strength of the electrostatic force increases between the plates, resulting in a stronger electrostatic interaction or force, and a stronger, or higher frequency, haptic feedback to the user. The strength can also be increased by energy transfer from spacers 126 to the parallel plate structure, as described herein.

Suitably, the frequency associated with the second, additional haptic feedback is at a higher frequency than the first, initial haptic feedback, though the reverse is also embodied herein. In exemplary embodiments, the frequency of vibration of the initial and/or additional haptic feedback is on the order of about 1 Hz to about 1000 Hz, more suitably about 1 Hz to about 500 Hz, about 1 Hz to about 200 Hz, about 10 Hz to about 200 Hz, about 10 Hz to about 100 Hz, or about 10 Hz, about 20 Hz, about 30 Hz, about 40 Hz, about 50 Hz, about 60 Hz, about 70 Hz, about 80 Hz, about 90 Hz or about 100 Hz.

In certain embodiments, a user's first contact may be of such a force to compress spacers 126 so that only a higher strength (including higher frequency) electrostatic interaction is provided.

Figure 3:
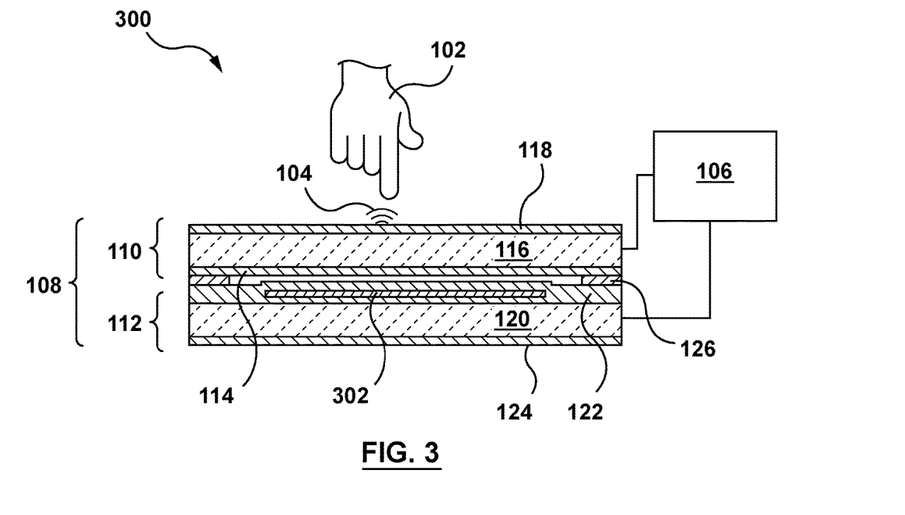
FIG. 3 shows a sectional view of a further actuator for providing haptic feedback in accordance with an embodiment hereof.

In additional embodiments, as shown in FIG. 3, an actuator 300 comprises a second actuator 302 positioned between first plate 110 and second plate 112. While second actuator 302 is suitably shown positioned below conductor 120, or at least below a portion of conductor 120, so as to allow the generation of an electrostatic field, it can also be positioned above conductor 120. An insulator (not shown due to space constraints) is also suitably positioned above conductor 120, between plate 112 and plate 110.

Upon compression of spacers 126, and ultimate contact of the plate structure, the second actuator 302 is configured to provide a second, additional haptic feedback. For example, second actuator 302 can be a piezoelectric polymer, dielectric elastomer, or composite to provide feedback, or can be a further actuator for haptic feedback including, for example, a smart material actuator, a smart material alloy, a macro fiber composite, a shape memory polymer, etc. By compressing spacers 126 to the point where the first and second plates 110, 112 come in contact, the electrostatic field is no longer active, but rather, a second, additional haptic feedback results only from second actuator 302. This second actuation can result from activation of a piezoelectric actuator.

In further embodiments, a dielectric elastomer (an elastomer positioned between two electrodes) can be included as spacer 126, which can provide the additional actuation as described herein.

As described throughout, the compression modulus of spacers 126 provides the ability to differentiate between a first, initial contact by user (at a first force), and a second, further contact (at a second force higher than the first force), whereby the spacers are compressed. As described herein, spacers 126 can be various hydrogels or piezo-materials, though in other embodiments spacers 126 can be other types of polymers, rubbers, elastic materials, etc. Suitably the compressive modulus of spacers 126 is on the order to about 0.1 kPa to about 150 kPa.

In still further embodiments, the actuators provided herein can provide haptic feedback where a user's contact triggers a response that combines both the initial electrostatic interaction and the additional electrostatic interaction (resulting from the compression of spacers 126) so as to provide a heightened, or enhanced haptic feedback. In embodiments as described herein where the compression of spacers 126 provides additional amplification of the electrostatic interaction, this haptic feedback can have a magnified effect (i.e., a stronger electrostatic interaction or increased frequency). In embodiments which employ the additional, second actuator, a user's contact can trigger feedback from both the electrostatic interaction and the additional, second actuation, including for example two different frequencies, or two different magnitudes of feedback occurring at the same, or substantially the same time.

In additional embodiments, provided herein are actuators for providing haptic feedback to a user comprising a first electrode, a second electrode, and one or more spacers positioned between and separating the first electrode and the second electrode. As described herein, suitably a first, initial contact of the actuator by the user at a first force provides a haptic feedback from an electrostatic interaction. A second, further contact by the user at a second force, which is greater than the first force, compresses the spacers and activates a second, additional haptic feedback from an electrostatic interaction.

Figure 4:
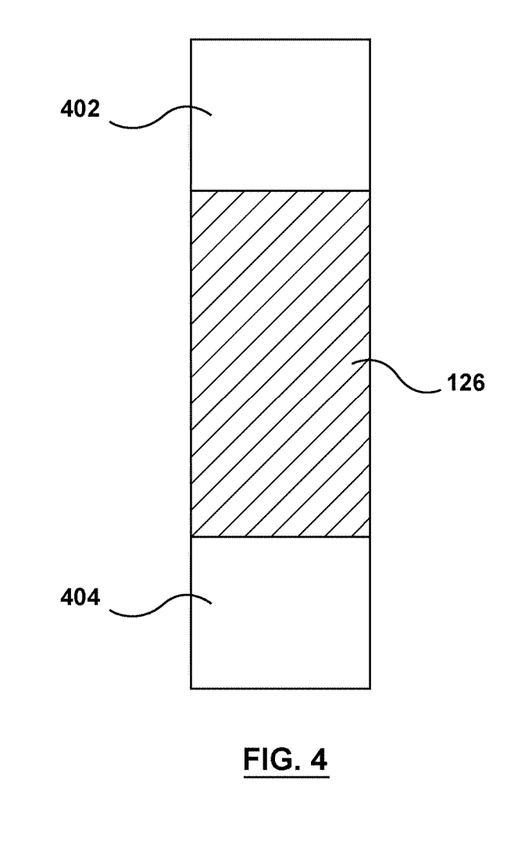
FIG. 4 shows a sectional view of a spacer structure in accordance with an embodiment hereof.

FIG. 4 shows an example of an electrode-spacer-electrode section of an actuator in accordance with embodiments described herein. As shown, spacer 126 is oriented between and separating a first electrode 402 and a second electrode 404. While insulators are not shown, they can be added to the structure. As described herein, upon compression of spacer 126, the first and second electrodes 402, 404 are placed or moved closer together to thereby increase the electrostatic interaction therebetween, and thereby provide the second, additional haptic feedback. In embodiments, this second, additional feedback is distinct from that which occurs from only an initial contact by a user (i.e., without compression of spacer 126), and can be a stronger electrostatic interaction, a higher frequency interaction, a combination of both, or other feedback distinct from the first feedback.

As described herein, spacer 126 can suitably comprise a hydrogel or a piezo(polymer) or a piezo(ceramic). Such actuators can also further comprise a substrate for interface with the user, as described herein.

Figure 5:
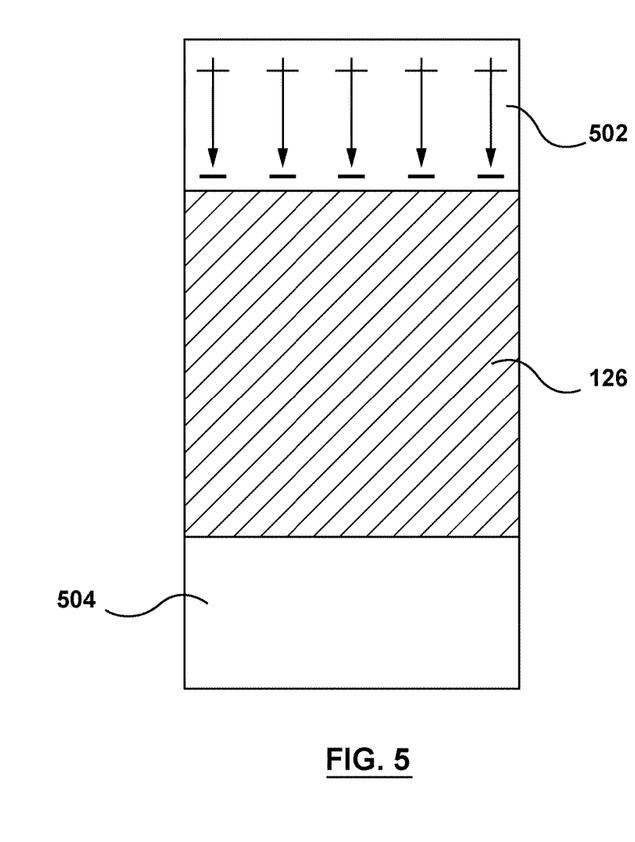
FIG. 5 shows a sectional view of a further spacer structure in accordance with an embodiment hereof.

FIG. 5 shows a further embodiment where spacer 126 separates electrode 504 from a polarizable structure 502. In such embodiments, polarizable structure 502 (e.g., a polarizable structure that has a permanent polarization), results in a separation of charge, for example as shown in FIG. 5. The charge separation in polarizable structure 502, in combination with electrode 504, can be sufficient to act as an actuator as described herein. In embodiments, upper electrode is not required in such actuators. Upon compression of spacer 126, polarizable structure 502 and electrode 504 are placed closer together, increasing the electrostatic interaction and providing a second, additional haptic feedback, distinct from that which occurs from only a first, initial contact by a user (i.e., lower force, without compression of spacer 126).

Figure 6:
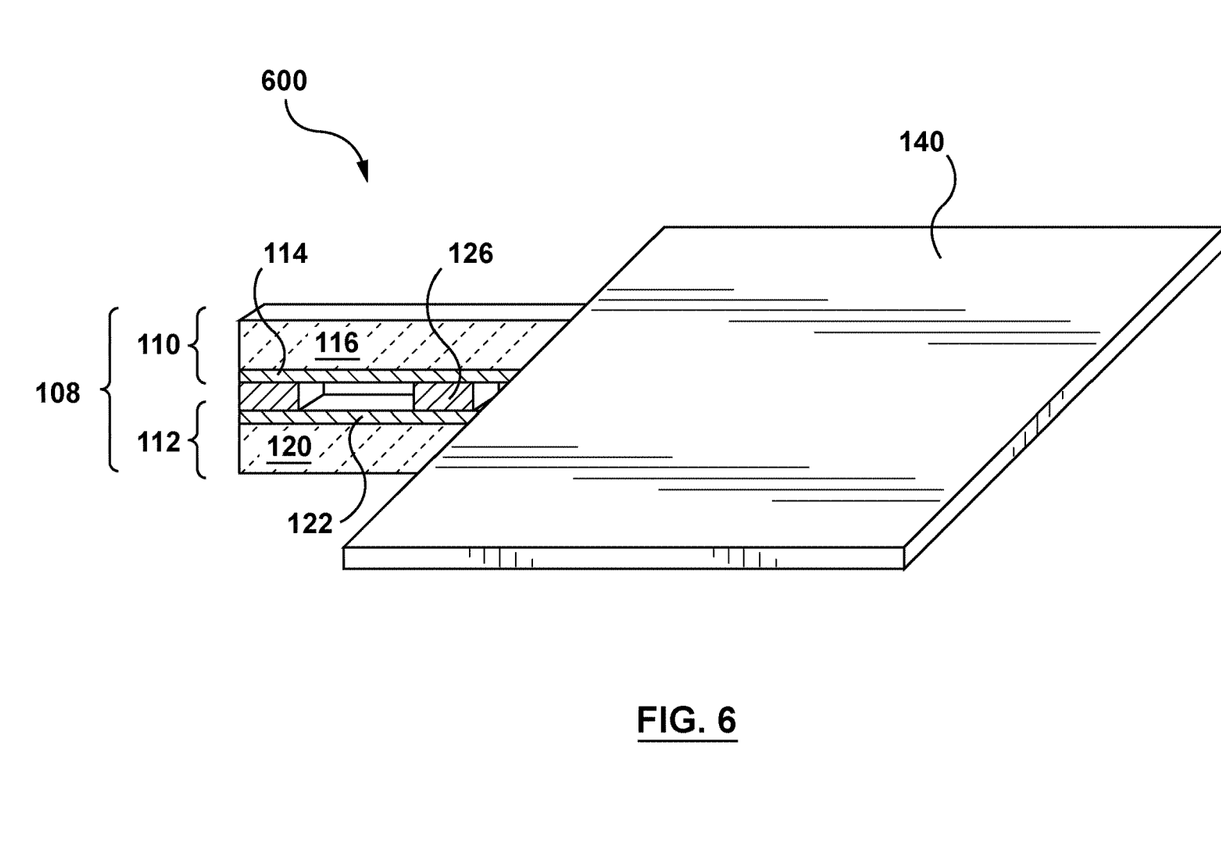
FIG. 6 shows a device comprising an actuator for providing haptic feedback in accordance with an embodiment hereof.

Also provided herein, as shown in FIG. 6, are devices for providing a first haptic feedback and a second haptic feedback to a user in response to a first contact and a second contact. A device 600, shown as an exemplary touchscreen (only shown partly to reveal structures below), includes a substrate 140 (e.g. an upper panel of a touchscreen), a parallel plate structure 108 associated with the substrate. As described herein, parallel plate structure 108 includes first plate 110 comprising first conductor 116 and at least a first insulator 114, and second plate 112 comprising second conductor and at least a second insulator 122. Parallel plate structure 108 also includes one or more spacers 126 positioned between and separating the first plate and the second plate.

Devices which can comprise the parallel plate structure described herein are noted throughout, and include, for example, mobile phones, tablets, computers, car interfaces, game consoles and controllers, etc. For example, as shown in FIG. 6, the parallel plate structure can be implemented below the surface of a touchscreen of a mobile phone or tablet, a screen of a computer, television, game system, touch pad, touch sensitive structure, computer monitor, laptop display device, workbook display device, kiosk screen, portable electronic device screen, or other suitable touch sensitive system, etc. The parallel plate structures can also be used in keyboards, interfaces in cars or other machinery and vehicles, etc. In gaming, the parallel plate structure can be used in various hand-held devices or controllers, etc. The parallel plate structure can also be included in wearables, including watches and bracelets, bands, clothing, bags, wallets, etc.

As described throughout, the first contact at a first force provides the first haptic feedback from an electrostatic interaction. The second contact at a second force, which is higher than the first force, compresses the spacers and activates the second haptic feedback.

Suitably, the spacers for use in the parallel plates of the devices described herein comprise a hydrogel, and in other embodiments, the spacers comprise a piezo(polymer) or a piezo(ceramic).

In the devices described herein, the second, additional haptic feedback is suitably from an electrostatic interaction. However, in further embodiments, the parallel plate structure can further include a second actuator positioned between the first plate and the second plate, which can provide the second, additional feedback. In such embodiments of the devices, the additional haptic feedback can be other than an electrostatic force, as described herein. In exemplary embodiments of the devices provided herein, the second actuator can be a smart material actuator.

As described herein, in embodiments of the devices, the haptic feedback from the initial electrostatic interaction (i.e., from the first, initial contact from the user) is at a first frequency and the second, additional haptic feedback (i.e., from the second, additional contact/compression of spacers) is at a second frequency. Suitably, in the devices, the second frequency associated with the additional haptic feedback is at a higher frequency than the first, initial haptic feedback, though the opposite can also be utilized.

While various embodiments have been described above, it should be understood that they have been presented only as illustrations and examples of the present technology, and not by way of limitation. It will be apparent to persons skilled in the relevant art that various changes in form and detail can be made therein without departing from the spirit and scope of the present technology. Thus, the breadth and scope of the present technology should not be limited by any of the above-described embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An actuator for providing haptic feedback to a user, comprising:
   a parallel plate structure comprising:
   i. a first plate comprising a first electrode;
   ii. a second plate comprising a polarizable structure having a permanent polarization; and
   iii. one or more spacers positioned between and separating the first plate and the second plate,
   wherein a first contact of the parallel plate structure by the user at a first force provides a haptic feedback from an electrostatic interaction;
   wherein a second contact by the user at a second force, which is greater than the first force, compresses the spacers and activates an additional haptic feedback to the user; and
   wherein the actuator is integrated into a wearable clothing.

2. The actuator of claim 1, wherein the second contact is a continuation of the first contact.

3. The actuator of claim 1, wherein the one or more spacers comprise a hydrogel.

4. The actuator of claim 1, wherein the one or more spacers comprise a piezo(polymer) or a piezo(ceramic).

5. The actuator of claim 1, wherein the additional haptic feedback is from an electrostatic interaction.

6. The actuator of claim 1, further comprising: a second actuator positioned between the first plate and the second plate.

7. The actuator of claim 6, wherein the second actuator provides the additional haptic feedback.

8. The actuator of claim 6, wherein the second actuator is a smart material actuator.

9. The actuator of claim 1, further comprising: a substrate in association with the parallel plate structure for providing a user interface for the user.

10. The actuator of claim 1, wherein the haptic feedback from the electrostatic interaction is at a first frequency and wherein the additional haptic feedback is at a second frequency.

11. The actuator of claim 10, wherein the second frequency is higher than the first frequency.

12. An actuator for providing haptic feedback to a user, comprising:
   a parallel plate structure comprising:
   a) a first electrode;
   b) a polarizable structure having a permanent polarization; and
   c) one or more spacers positioned between and separating the first electrode and the polarizable structure having the permanent polarization,
   wherein a first contact of the actuator by the user at a first force provides a haptic feedback from an electrostatic interaction;
   wherein a second contact by the user at a second force, which is greater than the first force, compresses the spacers and activates an additional haptic feedback from an electrostatic interaction; and wherein the actuator is integrated into a wearable clothing.

13. The actuator of claim 12, wherein the one or more spacers comprise a hydrogel.

14. The actuator of claim 12, wherein the one or more spacers comprise a piezo(polymer) or a piezo(ceramic).

15. The actuator of claim 12, further comprising: a substrate in association with the parallel plate structure configured to provide a user interface for the user.

16. The actuator of claim 12, wherein the second contact is a continuation of the first contact.

17. A wearable device for providing a first haptic feedback and a second haptic feedback to a user in response to a first contact and a second contact, comprising:
   a) a substrate integrated into a wearable clothing;
   b) a parallel plate structure associated with the substrate, the parallel structure comprising:
      i. a first plate comprising a first electrode;
      ii. a second plate comprising a polarizable structure having a permanent polarization and at least a second insulator; and
      iii. one or more spacers positioned between and separating the first plate and the second plate,
      wherein the first contact at a first force provides the first haptic feedback from an electrostatic interaction; and
      wherein the second contact at a second force, which is higher than the first force, compresses the spacers and activates the second haptic feedback.

18. The wearable device of claim 17, wherein the one or more spacers comprise a hydrogel.

19. The wearable device of claim 17, wherein the one or more spacers comprise a piezo(polymer) or a piezo(ceramic).

20. The wearable device of claim 17, wherein the second haptic feedback is from an electrostatic interaction.

21. The wearable device of claim 17, further comprising a second actuator positioned between the first plate and the second plate.

22. The wearable device of claim 21, wherein the second actuator provides the second haptic feedback.

23. The wearable device of claim 22, wherein the second actuator is a smart material actuator.

24. The wearable device of claim 17, wherein the first haptic feedback from the electrostatic interaction is at a first frequency and wherein the second haptic feedback is at a second frequency.

25. The wearable device of claim 24, wherein the second frequency is higher than the first frequency.

26. The wearable device of claim 17, wherein the second contact is a continuation of the first contact.

* * * * *